US011615068B2

(12) United States Patent
Bulkowski et al.

(10) Patent No.: US 11,615,068 B2
(45) Date of Patent: Mar. 28, 2023

(54) METHODS AND SYSTEMS OF MANAGING DELETES IN A DATABASE NODE OF A NOSQL DATABASE

(71) Applicants: Brian J. Bulkowski, Menlo Park, CA (US); Andrew Gooding, Mountain View, CA (US); Venkatachary Srinivasan, Sunnyvale, CA (US)

(72) Inventors: Brian J. Bulkowski, Menlo Park, CA (US); Andrew Gooding, Mountain View, CA (US); Venkatachary Srinivasan, Sunnyvale, CA (US)

( * ) Notice: Subject to any disclaimer, the term of this patent is extended or adjusted under 35 U.S.C. 154(b) by 145 days.

(21) Appl. No.: 15/618,117

(22) Filed: Jun. 8, 2017

(65) Prior Publication Data

US 2017/0357687 A1    Dec. 14, 2017

Related U.S. Application Data

(60) Provisional application No. 62/347,245, filed on Jun. 8, 2016.

(51) Int. Cl.
*G06F 16/00* (2019.01)
*G06F 7/00* (2006.01)
*G06F 16/23* (2019.01)
*G06F 11/14* (2006.01)

(52) U.S. Cl.
CPC .......... *G06F 16/2365* (2019.01); *G06F 11/14* (2013.01)

(58) Field of Classification Search
CPC ... G06F 16/2365; G06F 16/2393; G06F 11/14
USPC ........................................................ 707/689
See application file for complete search history.

(56) References Cited

U.S. PATENT DOCUMENTS

| 9,576,038 B1* | 2/2017 | Huang .................... G06F 16/27 |
| 2004/0167901 A1* | 8/2004 | Margolus ............ G06F 16/2358 |
| 2007/0299887 A1* | 12/2007 | Novik .................... G06F 16/273 |
| 2011/0058490 A1* | 3/2011 | Mills .................... H04L 12/1886 |
| | | 370/252 |
| 2015/0120656 A1* | 4/2015 | Ramnarayanan ... G06F 16/2358 |
| | | 707/616 |

* cited by examiner

*Primary Examiner* — Raquel Perez-Arroyo

(57) ABSTRACT

In one aspect, a computerized method for managing tombstones in a node of a Distributed Database Base System (DDBS) includes the step of providing a rule that, for a namespace in a record of the node of the DDBS that allows expiration, mandates that a later generation's expiration time of the namespace never decreases. The computerized method includes the step of determining that an administrator of the DDBS has set an expiration time of the namespace to infinity. The computerized method includes the step of implementing a background process of the DDBS, wherein the background process scans a DDBS node's drive and flags a set of extant tombstones that are no longer covering viable namespaces or viable records. The computerized method includes the step of deleting all the flagged tombstones.

7 Claims, 5 Drawing Sheets

METHODS AND SYSTEMS OF MANAGING DELETES IN A DATABASE NODE OF A NOSQL DATABASE

CROSS-REFERENCE TO RELATED APPLICATIONS

This application claims priority to U.S. Provisional Application No. 62/347,245, titled and METHODS AND SYSTEMS OF MANAGING DELETES IN A DATABASE NODE OF A NO-SQL DATABASE filed on 8 Jun. 2016. This provisional application is incorporated by reference in its entirety.

BACKGROUND

1. Field

This application relates database systems and more specifically to a system, article of manufacture and method for managing deletes in a database node of a NoSQL database.

2. Related Art

The data on disk can then be erased through the defragmentation process. Records in a NoSQL database node can be deleted first from an index. The defragmentation process can recombine blocks in order to create new empty blocks. This can be done for performance optimization, for example. However, in case of cold start of the database node, the index may be rebuilt from the persistent storage and hence, data in a 'deleted' record can be available as it has not yet been erased via the defragmentation process. In this case, the data may re-appear as not deleted. The record may also have an earlier generation signifier than a current and viable generation of the data. In this case, a 'deleted' data and/or record can actually replace a current version. The processes and system provided herein can be used to ameliorate this issue.

BRIEF SUMMARY OF THE INVENTION

In one aspect, a computerized method for managing deletes in a node of a Distributed Database Base System (DDBS) includes the step of providing a rule that, for a namespace in a record of the node of the DDBS that allows expiration, mandates that a later generation's expiration time of the namespace never decreases. The computerized method includes the step of determining that an administrator of the DDBS has set an expiration time of the namespace to infinity. The computerized method includes the step of implementing a background process of the DDBS, wherein the background process scans a DDBS node's drive and flags a set of extant tombstones that are no longer covering viable namespaces or viable records. The computerized method includes the step of deleting all the flagged tombstones.

Optionally, the DDBS can be a NoSQL DDBS. A subsequent generation of the namespace in the record cannot have a shorter time to live (TTL) than its previous version in a Multiversion concurrency control (MVCC) chain. The tombstone can be written with a same expiration time as the namespace the tombstone covers such that all the deleted records expire together. the MVCC chain comprise a concurrency control method that can be used by a database management system of the NoSQL DDBS to provide a concurrent access to the NoSQL DDBS.

Figure 1:
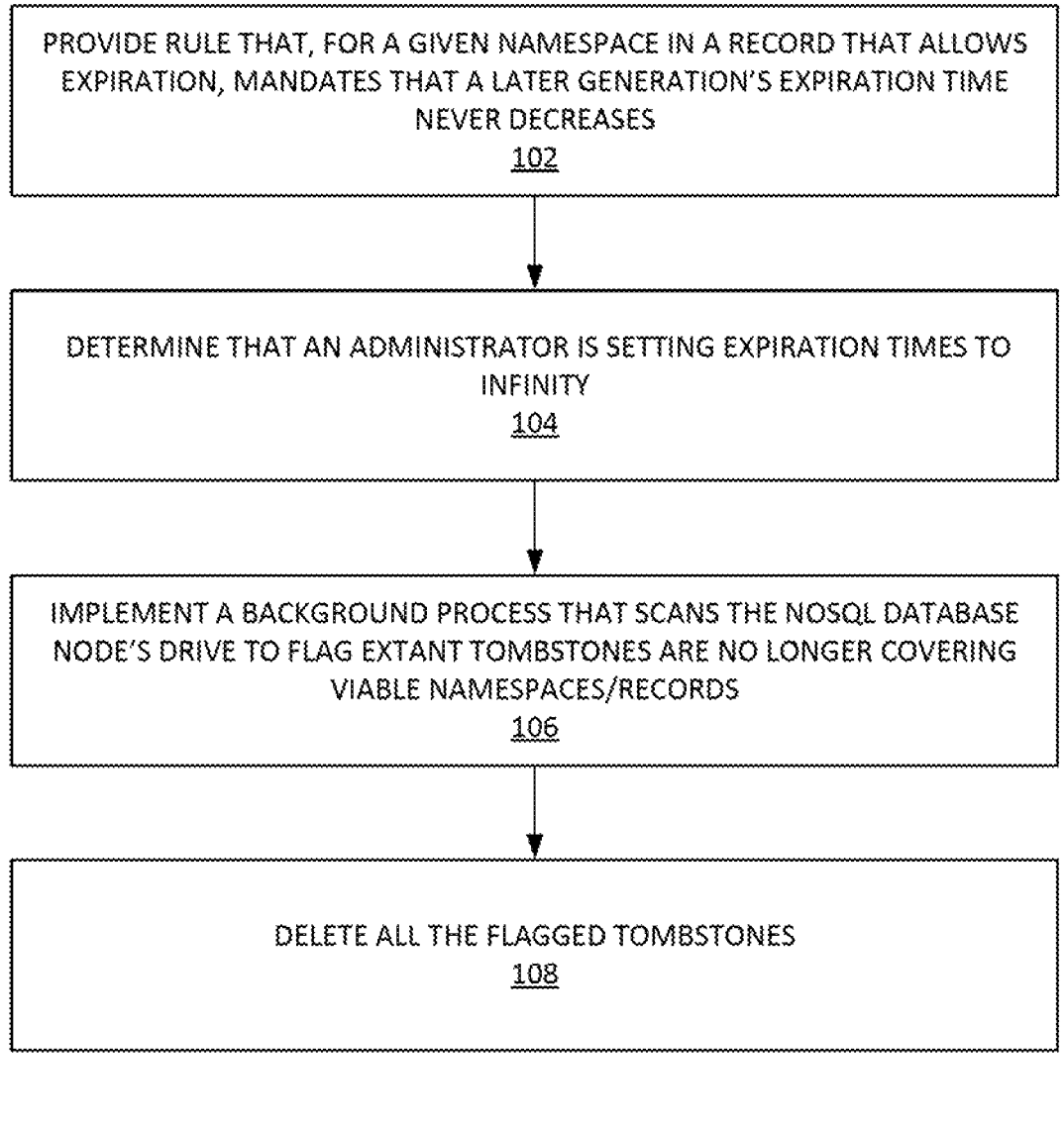
FIG. 1 illustrates art example process of managing deletes in a database node of a NoSQL database, according to some embodiments.

The Figures described above are a representative set, and are not an exhaustive with respect to embodying the invention.

DESCRIPTION

Disclosed are a system, method, and article of manufacture of managing deletes in a database node of a NoSQL database. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Dynamic random-access memory (DRAM) can be a type of random-access memory that stores each bit of data in a separate capacitor within an integrated circuit.

Expiration can be a date a date and time on which a record of a database is to be deleted and/or otherwise made inaccessible. For example, a date, record can be set to expire, in seconds from Jan. 1, 2010 00:00:00 GMT.

Multiversion concurrency control (MVCC) is a concurrency control method that can be used by database management systems to provide concurrent access to the database and in programming languages to implement transactional memory.

Solid-state drive (SSD) can be a data storage device using integrated circuit assemblies as memory to store data persistently.

Time to live (TTL) can be a mechanism that limits the lifespan or lifetime of data in a computer or network. TTL may be implemented as a counter or timestamp attached to or embedded in the data. Once the prescribed event count or timespan has elapsed, data is discarded.

Tombstone can be a deleted record in a replica of a distributed data store.

Exemplary Methods

An example mechanism for deleting records is now discussed.

FIG. 1 illustrates an example process 100 of managing deletes in a database node of a NoSQL database, according to some embodiments. The NoSQL database can be a flash-optimized in-memory NoSQL database. An MVCC chain can be utilized to track a current version of a record and determine deleted and/or expired versions. An expiration time (e.g. a TTL) can be provided for the deleted versions. Tombstones can be used to indicate deleted records. Accordingly, in step 102, a rule can be provided that, for a given namespace in a record that allows expiration, mandates that a later generation's expiration time never decreases. For example, a subsequent generation of a namespace in a record cannot have a shorter TTL than its previous version in an MVCC chain. In this way, it can then be safe to write tombstone with a same expiration time as the namespace it covers such that all the deleted records expire together. In step 104, process 100 can determine that an administrator is setting expiration (e.g. of a tombstone associated with a deleted record) times to infinity. In step 106, process 100 can implement a background process that scans the NoSQL database node's drive to flag extant tombstones are no longer covering viable namespaces/records. In step 108, the background process can delete all the flagged tombstones. Process 100 can be implemented without redirection pointers.

Figure 2:
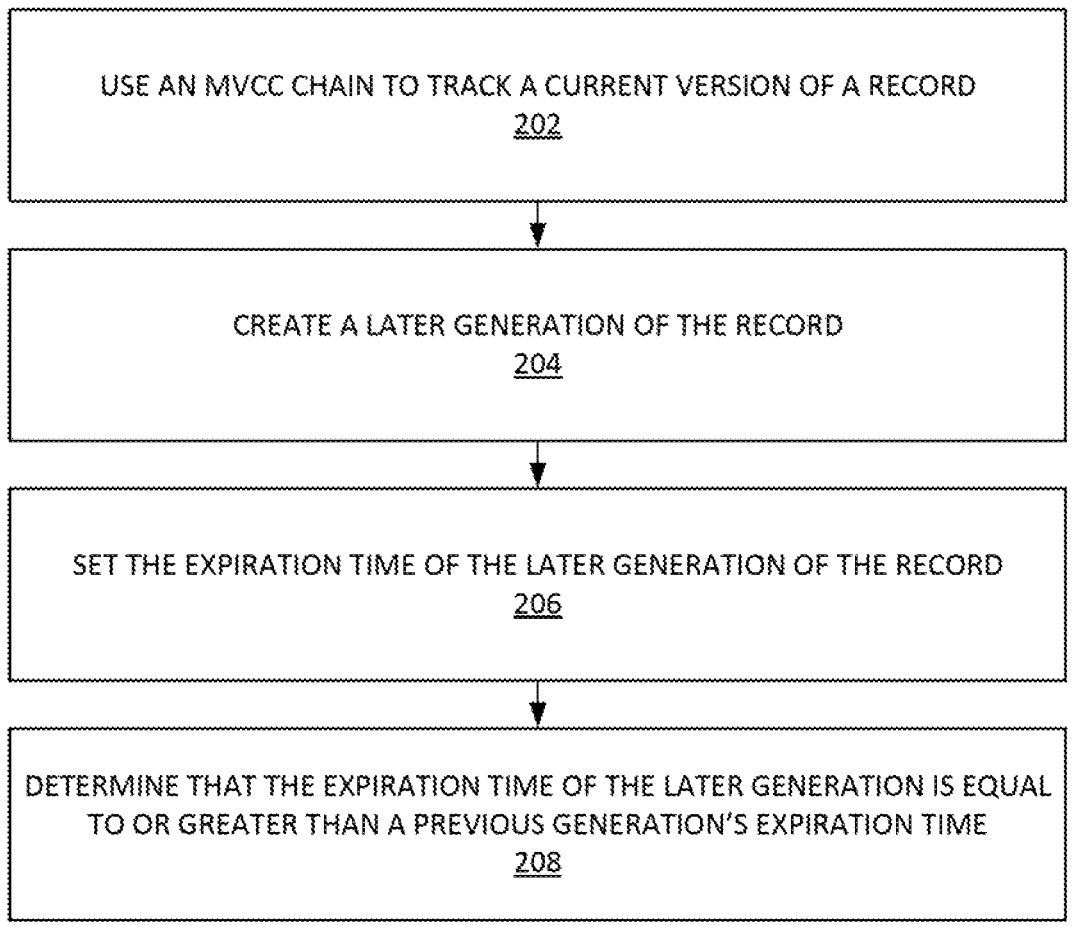
FIG. 2 illustrates an example process for managing record expiration in an MVCC chain in a No-SQL distributed database, according to some embodiments.

FIG. 2 illustrates an example process 200 for managing record expiration in an MVCC chain in a No-SQL distributed database, according to some embodiments. In step 202, process 200 can use an MVCC chain to track a current version of a record. The MVCC chain can be used to determine deleted and/or expired versions, of the record as well. In step 204, process 200 can create a later generation of the record. In step 206, process 200 can set the expiration time of the record created in step 204. In step 208, process 200 determines that the later generation expiration time of the later generation is equal to or greater than the previous generation's expiration time. If not, then process 200 can perform some action that results in, inter alia: the resetting of the expiration time for the later generation of the record to be equal to or greater than the expiration time of the previous generation(s) of the record, not allowing the later generation of the record to be equal to or greater than the expiration time of the previous generation of the record, etc. In this way, the expiration time of later generations of a record do not decrease.

Figure 3:
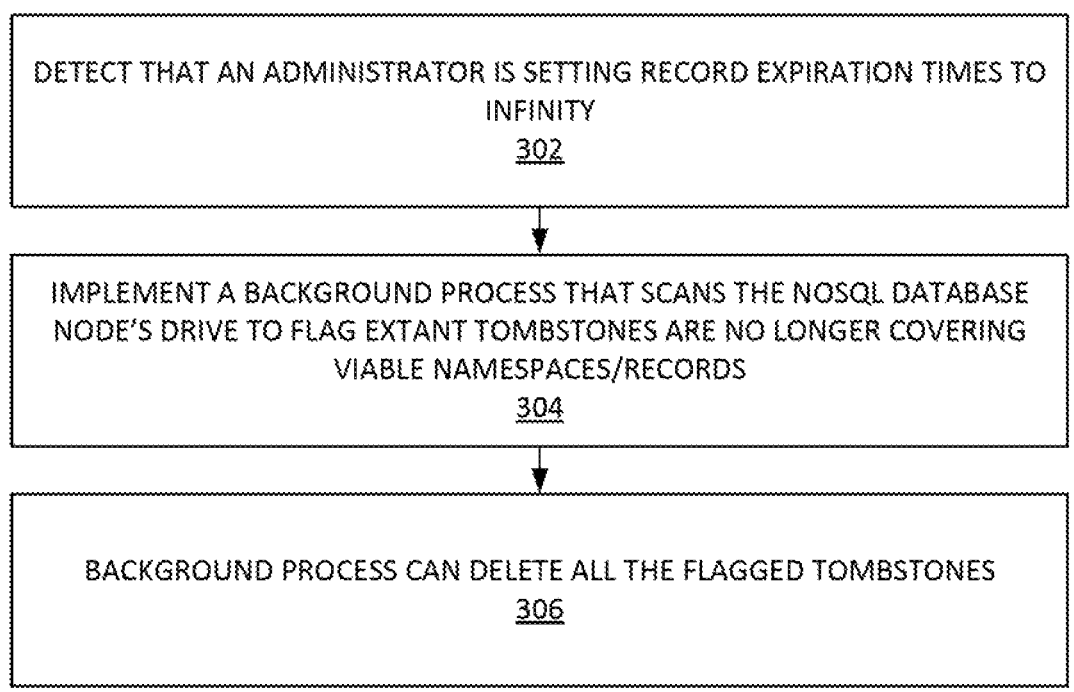
FIG. 3 illustrates an example process of managing tombstones when tombstone expirations are set to infinity, according to some embodiments.
Figure 3:

FIG. 3 illustrates an example process 300 of managing tombstones when tombstone expirations are set to infinity, according to some embodiments. In step 302, process 300 can detect that an administrator is setting record expiration (e.g. of a tombstone associated with a deleted record) times to infinity. In step 304, process 300 can implement a background process that scans the NoSQL database node's drive to flag extant tombstones are no longer covering viable namespaces/records. In step 306, the background process can delete all the flagged tombstones.

Additional examples methods are now discussed. It is noted, that in some embodiments, a NoSQL database node may be configured to expire or evict least recently updated data. Example expiration and eviction algorithms can use a database record's TTL value to determine eligibility for removal. The frequency of expiration and eviction passes can be determined by one or more configuration parameter(s). An eviction run can happen when a data exceeds a specified threshold in order to allow a database cluster to continue processing new writes. Eviction can be a version of early expiration since eviction only removes data that has a TTL set and chooses the soonest to expire records to evict first (e.g. in namespaces with similar TTL across records). Eviction can be when records are removed before their configured expiration time, in some examples, a namespace can be configured and tuned to fit a wide variety of use cases.

Expiration can be a normal process within the database node such that when TTL has been set to a positive integer (it is noted that records with no TTL or TTL of '0' or '−1' are not included in expiration or eviction). Unless a client sends an override, the TTL used for a write can be the default TTL for the namespace. When a record is written, the database server can determine the TTL (e.g. the default TTL and/or that specified by the client) and adds it to the current time to get the expiration time. When a record hits its expiration time a namespace supervisor can expire it. In this way, it is removed from the database cluster. An update and/or a touch from a client can reset the expiration time as if it were a new write. Reads may not affect expiration time. The namespace supervisor thread can manage both evictions and expirations. A namespace supervisor thread may not continuously run; instead it can periodically run. The time interval at which the namespace supervisor thread wakes up can be configured.

Exemplary Computer Architecture and Systems

Figure 4:
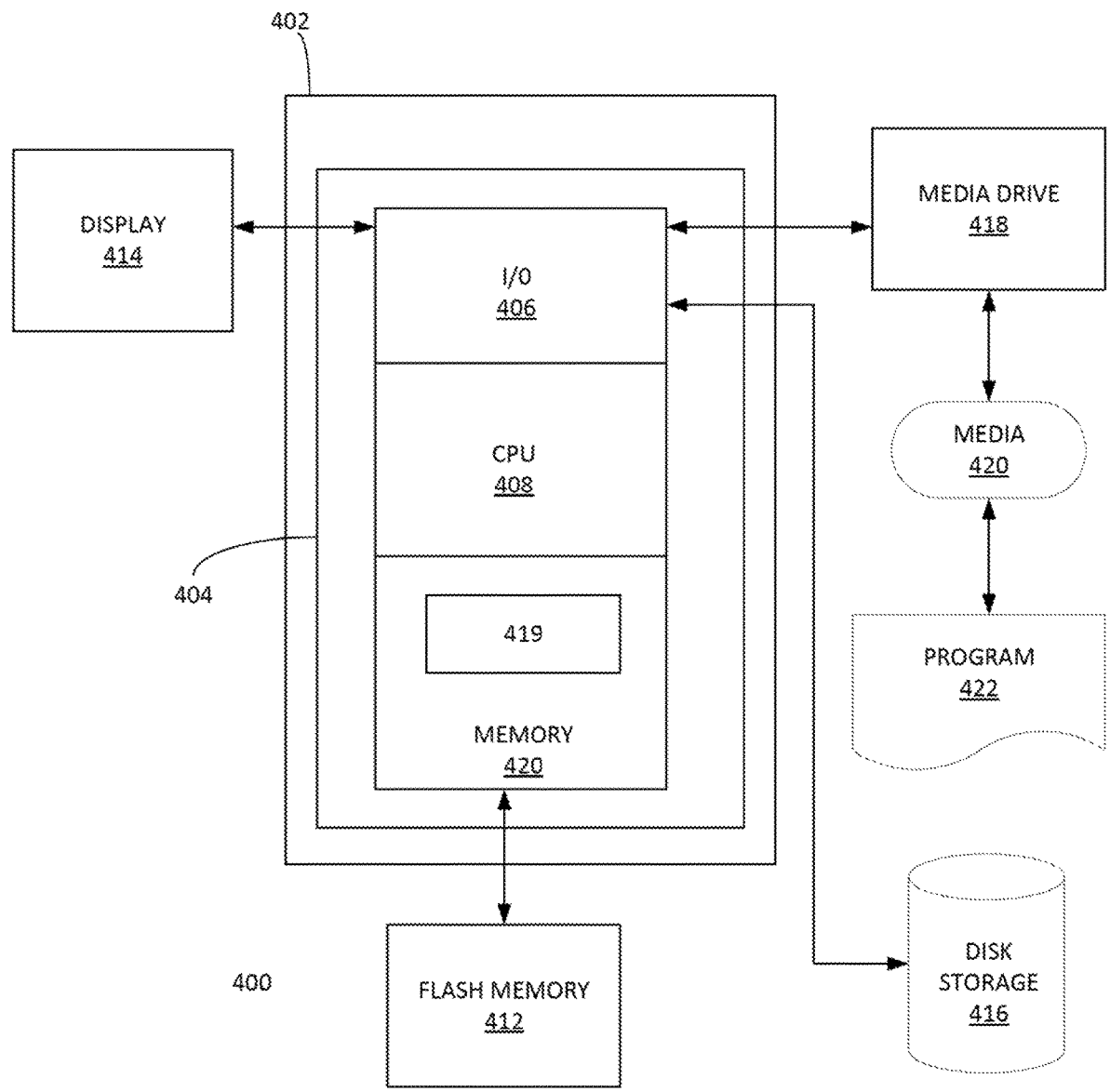
FIG. 4 is a block diagram of a sample-computing environment that can be utilized to implement various embodiments.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 5:
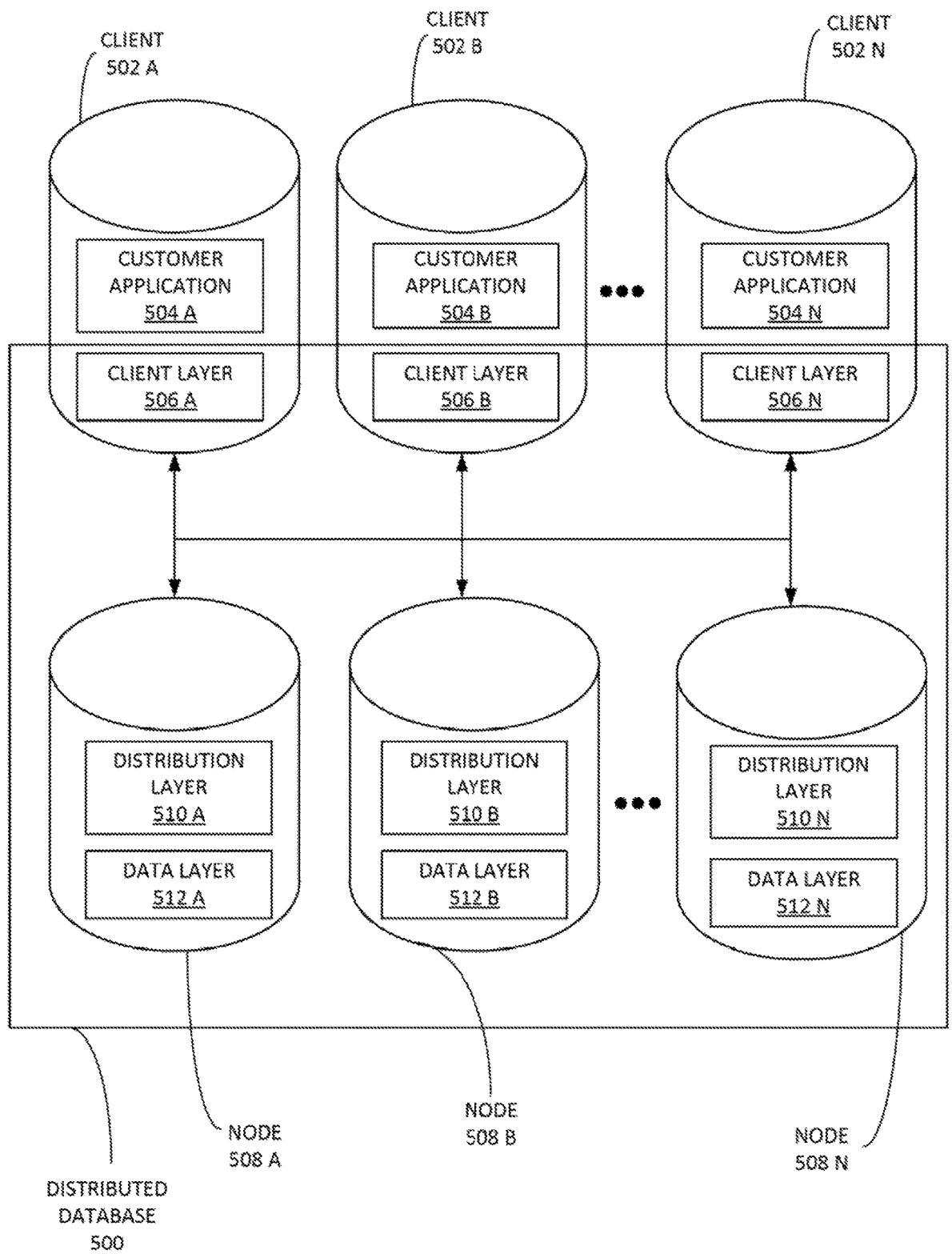
FIG. 5 shows, in a block diagram format, a distributed database system operating in a computer network according to an example embodiment.

FIG. 5 shows, in a block diagram format, a distributed database system (DDBS) 500 operating in a computer network according to an example embodiment. In some examples, DDBS 500 can be an Aerospike® database. DDBS 500 can typically be a collection of databases that can be stored at different computer network sites (e.g. a server node). Each database may involve different database management systems and different architectures that distribute the execution of transactions. DDBS 500 can be managed in such a way that it appears to the user as a centralized database. It is noted that the entities of distributed database system (DDBS) 500 can be functionally connected with a PCIe interconnections (e.g. PCIe-based switches, PCIe communication standards between various machines, bridges such as non-transparent bridges, etc.). In some examples, some paths between entities can be implemented with Transmission Control Protocol (TCP), remote direct memory access (RDMA) and the like.

DDBS 500 can be a distributed, scalable NoSQL database, according to some embodiments. DDBS 500 can include, inter alia, three main layers: a client layer 506 A-N a distribution layer 510 A-N and/or a data layer 512 A-N. Client layer 506 A-N can include various DDBS client libraries. Client layer 506 A-N can be implemented as a smart client. For example, client layer 506 A-N can implement a set of DDBS application program interfaces (APIs) that are exposed to a transaction request. Additionally, client layer 506 A-N can also track cluster configuration and manage the transaction requests, making any change in cluster membership completely transparent to customer application 504 A-N.

Distribution layer 510 A-N can be implemented as one or more server cluster nodes 508 A-N. Cluster nodes 508 A-N can communicate to ensure data consistency and replication across the cluster. Distribution layer 510 A-N can use a shared-nothing architecture. The shared-nothing architecture can be linearly scalable. Distribution layer 510 A-N can perform operations to ensure database properties that lead to the consistency and reliability of the DDBS 500. These properties can include Atomicity, Consistency, Isolation, and Durability.

Atomicity. A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback).

Consistency. This property deals with maintaining consistent data in a database system A transaction can transform the database from one consistent state to another. Consistency falls under the subject of concurrency control.

Isolation. Each transaction should carry out its work independently of any other transaction that may occur at the same time.

Durability. This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, distribution layer 510 A-N can ensure that the cluster remains fully operational when individual server nodes are removed from or added to the cluster. On each server node, a data layer 512 A-N can manage stored data on disk. Data layer 512 A-N can maintain indices corresponding to the data in the node. Furthermore, data layer 512 A-N be optimized for operational efficiency, for example, indices can be stored in a very tight format to reduce memory requirements, the system can be configured to use low level access to the physical storage media to further improve performance and the likes.

In some embodiments, cluster nodes 508 A-N can be an Aerospike Smart Cluster™. Cluster nodes 508 A-N can have a shared-nothing architecture (e.g. there is no single point of failure (SPOF)). Every node in the duster can be substantially identical. For example, cluster nodes 508 A-N can start with a few nodes and then be scaled up by adding additional hardware. Cluster nodes 508 A-N can scale linearly. Data can be distributed across cluster nodes 508 A-N can using randomized key hashing (e.g. no hot spots, just balanced load). Nodes can be added and/or removed from cluster nodes 508 A-N can without affecting user response time (e.g. nodes rebalance among themselves automatically).

Auto-discovery. Multiple independent paths can be used for nodes discovery—an explicit heartbeat message and/or via other kinds of traffic sent to each other using the internal cluster inter-connects. The discovery algorithms can avoid mistaken removal of nodes during temporary congestion. Failures along multiple independent paths can be used to ensure high confidence in the event. Sometimes nodes can depart and then join again in a relatively short amount of time (e.g. with router glitches). DDBS 500 can avoid race conditions by enforcing the order of arrival and departure events.

Balanced Distribution. Once consensus is achieve and each node agrees on both the participants and their order within the cluster, a partitions algorithm (e.g. Aerospike Smart Partitions™ algorithm) can be used to calculate the master and replica nodes for any transaction. The partitions algorithm can ensure no hot spots and/or query volume is distributed evenly across all nodes. DDBS 500 can scale without a master and eliminates the need for additional configuration that is required in a sharded environment.

Synchronous Replication. The replication factor can be configurable. For example, a deployments use a replication factor of two (2). The cluster can be rack-aware and/or replicas are distributed across racks to ensure availability in the case of rack failures. For writes with immediate consistency, writes are propagated to all replicas before committing the data and returning the result to the client. When a cluster is recovering from being partitioned, the system can be configured to automatically resolve conflicts between different copies of data using timestamps. Alternatively, both copies of the data can be returned to the application for resolution at that higher level. In some cases, when the replication factor can't be satisfied, cluster can be configured to either decrease the replication factor and retain all data, or begin evicting the oldest data that is marked as disposable. If the cluster can't accept any more data, it can begin operating in a read-only mode until new capacity becomes available, at which point it can automatically begin accepting application writes.

Self-Healing and Self-Managing. DDSS 500 and cluster nodes 508 A-N can be self-healing. If a node fails, requests can be set to automatically fail-over. When a node fails or a new node is added, the cluster automatically re-balances and migrates data. The cluster can be resilient in the event of node failure during re-balancing itself. If a cluster node receives a request for a piece of data that it does not have locally, it can satisfy the request by creating an internal proxy for this request, fetching the data from the real owner using the internal cluster interconnect, and subsequently replying to the client directly. Adding capacity can include installing and/or configuring a new server and cluster nodes 508 A-N can automatically discover the new node and re-balances data (e.g. using a Paxos consensus algorithm).

DDBS 500 can have a Shared-Nothing architecture: every node in an Aerospike cluster is identical, all nodes are peers and there is no single point of failure. Data is distributed evenly across nodes in a cluster using a Smart Partitions™ algorithm.

It is noted that in an operational database, the fastest and most predictable index can be the primary key index. This index can provide the most predictable and fastest access to row information in a database. The primary key index can be a blend of distributed hash table technology with a distributed tree structure in each server. In one example, the entire keyspace in a namespace (e.g. a database) can be partitioned using a robust hash function into partitions. There can be total of 4096 partitions and are equally distributed across nodes in the cluster. At the lowest level, a red-black in-memory structure can be used, similar to the data structures used in a MemCache system. The primary Index can be on the twenty (20) byte hash (e.g. also called digest) of the specified primary key. While this expands the key size of some records (which might have, for example, a unique eight (8) byte key), it can be beneficial because the code works predictably regardless of input key size, or input key distribution.

Secondary indexes can be on the non-primary key, which gives the ability to model one to many relationships. Indexes are specified on a bin-by-bin (like columns in an RDBMS) basis. This can allow efficient updates and minimizes the amount of resources required to store the indexes. A data description language (DDL) can be used to determine which bins and type are to be indexed. Indexes can be created and removed dynamically through provided tools or the API.

CONCLUSION

Although the present embodiments have been described with reference to specific example embodiments, various modifications and changes can be made to these embodiments without departing from the broader spirit and scope of the various embodiments. For example, the various devices, modules, etc, described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for managing deletes in a node of a Distributed Database Base System (DDBS) comprising:
    providing a rule that, for a namespace in a record of the node of the DDBS that allows expiration, mandates that a later generation's expiration time of the namespace never decreases, wherein the DDBS comprises a NoSQL DDBS;
    determining that an administrator of the DDBS has set an expiration time of a tombstone associated with a deleted record to infinity;
    implementing a background process of the DDBS, wherein the background process scans a DDBS node's drive and flags a set of extant tombstones that are no longer covering viable namespaces or viable records, and wherein the background process is implemented without redirection pointers; and
    deleting all the flagged tombstones, and
    wherein a subsequent generation of the namespace in the record cannot have a shorter time to live (TTL) than its previous version in a Multiversion concurrency control (MVCC) chain, and the MVCC chain is used to track a current version of the record and determine deleted and/or expired versions, and
    wherein the tombstone is written with a same expiration time as a namespace the tombstone covers such that all of a plurality of deleted records expire together, wherein the TTL is provided for the deleted record, and wherein the tombstone is used to indicate the deleted record.

2. The computerized method of claim 1, wherein the MVCC chain comprises a concurrency control method that can be used by a database management system of the NoSQL DDBS to provide a concurrent access to the NoSQL DDBS.

3. A computerized system for managing deletes in one or more nodes of a Distributed Database Base System (DDBS) comprising:
    a processor configured to execute instructions;
    a memory including instructions when executed on the processor causes the processor to perform operations that:
        provide a rule that, for a namespace in a record of a node in the one or more nodes of the DDBS that allows expiration, mandates that a later generation's expiration time of the namespace never decreases, wherein the DDBS comprises a NoSQL DDBS;

determine that an administrator of the DDBS has set an expiration time of a tombstone associated with a deleted record to infinity;

implement a background process of the DDBS, wherein the background process scans a DDBS node's drive and flags a set of extant tombstones that are no longer covering viable namespaces or viable records, and wherein the background process is implemented without redirection pointers; and delete all the flagged tombstones, and wherein a subsequent generation of the namespace in the record cannot have a shorter time to live (TTL) than its previous version in a Multiversion concurrency control (MVCC) chain, use the MVCC chain to track a current version of the record and determine deleted and expired versions, and wherein the tombstone is written with a same expiration time as a namespace the tombstone covers such that all of a plurality of deleted records expire together, wherein the TTL is provided for the deleted record, and wherein the tombstone is used to indicate the deleted record.

4. The computerized system of claim 3, wherein the MVCC chain comprises a concurrency control method that can be used by a database management system of the NoSQL DDBS to provide a concurrent access to the NoSQL DDBS.

5. A computerized method for managing a node of a Distributed Database Base System (DDBS) comprising:

using a Multiversion concurrency control (MVCC) chain to track a current version of a record and determine deleted and expired versions, wherein a subsequent generation of a namespace in the record cannot have a shorter time to live (1 IL) than its previous version in the MVCC chain;

creating a later generation of the record;

setting an expiration time of the later generation of the record;

determining that the expiration time of the later generation of the record is equal to or greater than a previous generation's expiration time;

determining that an administrator of the DDBS has set an expiration time of a tombstone associated with a deleted record of the node of the DDBS to infinity;

implementing a background process of the DDBS, wherein the background process scans a DDBS node's drive and flags a set of extant tombstones that are no longer covering viable namespaces or viable records, and wherein the background process is implemented without redirection pointers; and deleting all the flagged tombstones.

6. The computerized method of claim 5, wherein the tombstone is written with a same expiration time as a namespace the tombstone covers such that all of a plurality of deleted records expire together.

7. The computerized method of claim 6 further comprising: providing a rule that, for a namespace in the record that allows expiration, mandates that a later generation's expiration time of the namespace never decreases.

* * * * *